US006795901B1

(12) United States Patent
Florek et al.

(10) Patent No.: US 6,795,901 B1
(45) Date of Patent: Sep. 21, 2004

(54) SHARED MEMORY INTERFACE WITH CONVENTIONAL ACCESS AND SYNCHRONIZATION SUPPORT

(75) Inventors: Randall A. Florek, West Hills, CA (US); Claire J. Lacour, Moorpark, CA (US)

(73) Assignee: Alliant Techsystems Inc., Edina, MN (US)

( * ) Notice: Subject to any disclaimer, the term of this patent is extended or adjusted under 35 U.S.C. 154(b) by 0 days.

(21) Appl. No.: 09/466,303

(22) Filed: Dec. 17, 1999

(51) Int. Cl.[7] .............................................. G06F 12/14
(52) U.S. Cl. ........................ 711/152; 711/2; 711/155; 711/163; 710/200; 710/305
(58) Field of Search ......................... 711/2, 150–152, 711/155, 163, 1; 709/213, 248, 400, 250; 710/305–306, 200, 108; 707/8; 713/400–401, 500–503, 600–601

(56) References Cited

U.S. PATENT DOCUMENTS

| 5,276,886 A | 1/1994 | Dror | 710/240 |
| 5,287,503 A | 2/1994 | Narad | 710/220 |
| 5,548,780 A * | 8/1996 | Krein | 710/200 |
| 5,579,505 A * | 11/1996 | Ohkami | 711/155 |
| 6,052,763 A * | 4/2000 | Maruyama | 711/152 |

* cited by examiner

Primary Examiner—Denise Tran
(74) Attorney, Agent, or Firm—Michael Blaine Brooks, P.C.; Andrew Steven Naglestad; Michael Blaine Brooks

(57) ABSTRACT

Disclosed is an apparatus and method for providing synchronization support in a multiprocessor environment using a memory interface that supports an atomic read-modify-write operation as well as conventional read and write access to memory. Selection of the operation is made dependent on which ever address of a plurality of addresses is used to reference a single physical memory location in which there is stored a lock variable used to restrict access to a shared resource. When the particular access corresponds to a read-modify-write operation, the lock variable is read out and a modified version written back into memory on the condition that the shared resource is available to the requesting processor. The method and apparatus executes read-modify-write operations by interface logic circuitry in response to a single processor read operation. Through these atomic or otherwise indivisible operations, the method and apparatus precludes multiprocessor conflict.

20 Claims, 6 Drawing Sheets

SHARED MEMORY INTERFACE WITH CONVENTIONAL ACCESS AND SYNCHRONIZATION SUPPORT

FEDERALLY SPONSORED RESEARCH

The invention was made with Government support under N00019-94-C-0078 awarded by the Department of the Navy. The Government has certain rights in the invention.

FIELD AND BACKGROUND OF THE INVENTION

The present invention relates to a computer bus structure for performing synchronization in a multiprocessor system with shared resources. More particularly, the present invention relates to a logic interface that supports atomic read-modify-write operations as well as normal read/write access to the shared memory of a multiprocessor environment using the redundant addressing of memory so as to select the desired function.

Process synchronization refers to the coordination of the concurrent activities of two or more processors of an embedded processor system. The processors involved in synchronization function with logic indicating the state of the process and cooperatively coordinate their actions by waiting on a condition that is capable of being set by any one of the competing processors. In the present invention, the condition is a variable that signifies the availability of a shared resource.

A specific problem of synchronization is mutual exclusion; a problem solved by the present invention by preventing two or more concurrent activities from simultaneously accessing a shared resource. The shared resource may be memory that is shared among a set of processors where the instructions that access the shared memory form a critical region. The critical region refers to a series of processor operations that must be executed in their entirety without interruption by another processor. The concern is that two or more processors with equal and unrestricted access to a memory, or a shared resource more generally, could result in one processor writing, modifying, or otherwise interfering with the data stored by another processor. In addition to coordinating the concurrent activities of multiple processors, multiple processes operating on a single processor may also compete for a resource.

The present solution to the mutual exclusion problem guarantees that once a processor of a multi-processor system has asserted control over the resource, any processor which subsequently requests access is denied simultaneous access if such use is inconsistent with the first processor's use of the resource. For example, where a first processor is modifying data in shared memory, every other processor must be denied concurrent access. In the alternative, limited concurrent access may be permitted, for example, where multiple processors require the resource for purposes of reading a memory location; such use being a consistent use.

A common approach to performing mutual exclusion is to use special instructions provided by the processor hardware called hardware primitives. Hardware primitives are the basic building blocks used to form a variety of user-level synchronization operations. The fundamental requirement of a primitive is that it must provide a processor with the capability to atomically read and modify a memory location. The instruction is atomic if the primitives are indivisible such that the execution of no other instructions can occur between the given pair of primitives. Indivisible operations prevent multiple processors from concurrently gaining access to a shared resource intended for exclusive use by only one processor at a time. Thus, atomic instructions by a first processor prevent another processor from changing the memory in the interim between the steps of a read and modify operation in which a first processor takes possession of the resource.

There are a number of read-modify-write primitives that can be used to implement synchronization. One such instruction is "test-and-set" which uses a mutual exclusion variable, commonly called a mutex or lock, to signify the availability of the shared resource to the processor. The mutex variable acts as a flag and coordinates multiple processors that may attempt to concurrently access the resource. A mutex variable is created for each resource where access must be restricted.

The test-and-set instruction is comprised of a read operation immediately followed by a write operation in which a lock variable is modified contingent upon the value initially read. The "test" of the mutex value is initiated by means of a read operation generated by a processor. The mutex is then compared against a predetermined value which, by convention, indicates the status of the resource. If the test of the lock indicates that the resource is free, a "set" operation is executed by means of a write instruction by which the lock variable is modified to indicate the updated status of the resource. The operation, for example, could test for "0" and then set the mutex to "1" in order to lock out other processors from accessing the resource. In this manner a processor asserts possession of a resource. A second processor attempting to gain access to the resource would therefore have logical notice that the resource is unavailable, thereby locking out the second processor until the processor in possession releases the resource by resetting the mutex value to its original value. It is critical that the read and write operations be performed in an atomic manner in order to prevent another processor from initiating a test-and-set instruction prior to completion of the primitive.

Mutual exclusion locks are well known in the prior art, and various other methods for implementing synchronization include software and operating system support. Software-based synchronization solutions use global variables to control access to critical regions, but are not extendable to multiprocessor systems. Another prior art solution uses semaphores implemented in the operating system with lower level primitives such as the test-and-set instruction. A significant disadvantage of lower level primitives is that they typically cannot be implemented on a system with incompatible processor types.

U.S. Pat. No. 5,287,503 to Narad implements an aliasing scheme for performing bit storage and bit manipulation of data using a physical atomic access register structure comprised of an array of flip-flops. A single physical atomic access register is accessible by means of three unique addresses which, after decoding, allow a processor to atomically access the shared register in order to read, set, or clear a bit by executing an access request to the corresponding address. While individual bits of data in the Narad access register can be atomically modified, the system is incapable of atomically performing a read and conditional write of a bit, thereby making it ineffective as a mutual exclusion apparatus.

U.S. Pat. No. 5,276,886 to Dror claims an interface structure for storage of hardware semaphores in which flag variables are stored in multiple 1-bit registers to which multiple processors have access. The disadvantage of the semaphore register is that it is a dedicated memory device capable of coordinating only as many shared resources as there are register structures. Since the Dror interface fails to provide conventional read and write access, the semaphore cannot be interleaved with the data it regulates where the shared resource is memory. As such, the Dror interface requires additional complexity in design while reducing the versatility of the system.

SUMMARY OF THE INVENTION

It is the object of this invention to provide read-modify-write functionality for the processors of a multiprocessor system. This functionality is particularly useful for processors which do not support indivisible memory operations necessary for performing mutual exclusion or processors which practice incompatible forms of mutual exclusion functionality in a multiprocessor system.

Another object of the present invention is to provide an apparatus for and method of performing atomic read-modify-write functionality on lock variables stored within the shared memory of any existing form of memory device without compromising conventional (i.e., general purpose storage) read and write access.

The present invention relates to a method and apparatus for providing synchronization support using a memory interface and extended address space, permitting both conventional read and write access as well as atomic read-modify-write operations on lock variables stored in memory to which each processor of the multiprocessor system has access.

The present invention provides enhanced performance over standard memory interfaces by permitting the implementation of read-modify-write functionality, addressable through a multiplicity of unique system bus addresses that map into the physical memory. The interface distinguishes a read-modify-write command from a conventional read instruction to the physical memory by decoding the bus address. A read-modify-write operation causes the mutex variable to be read and subsequently modified by the logic circuitry depending on the present value of the mutex variable. The value of the lock variable in turn is dependent upon the number of processors accessing the resource to which the lock variable corresponds, as well as the nature of the use of the resource.

In the first of two embodiments, the read-modify-write operation takes the form of a test-and-set operation performed in response to a processor-generated read of a mutex variable. The test-and-set operation consists of: (a) a processor-generated read command to an upper memory address that aliases the physical address typically accessible only through conventional read/write operations and (b) a conditional write command automatically executed by the logic circuitry of the interface. This upper memory address permits the physical memory to emulate a non-existent memory device that would otherwise be dedicated to the purpose of storing lock variables.

A processor obtains exclusive use of the resource by locking the mutex variable. To acquire a resource a processor executes a test-and-set operation on a mutex variable to determine the availability of the associated resource and to perform a lock of the resource if the resource is free. Until the processor in possession of the resource resets the mutex variable, a second processor is prohibited from accessing the resource in a manner that might interfere with the first processor's use of the resource. Only upon the release of the lock variable will the second processor be able to set the mutex variable to signify its exclusive use of the resource.

The shared resource interface frees the software and operating system from having to run a lock program, thereby eliminating the overhead and consumption of resources associated with the execution of such software. The shared resource interface eliminates the need for a separate memory device dedicated to storing mutex variables, and permits the lock variable to be placed in memory contiguous with the resource when the resource is the memory itself. Furthermore, the shared resource interface can be implemented on a diverse range of processors and systems including those that do not support atomic synchronization, without extending the system bus with additional control lines.

A second embodiment is described in which the read-modify-write operation takes the form of a fetch-and-increment instruction. In this embodiment, multiple processors are granted concurrent use of a shared resource on the condition that concurrent use is compatible with and avoids interference between all processors within the multiprocessor system.

DETAILED DESCRIPTION OF THE INVENTION

A shared resource interface is disclosed wherein each processor of a multiprocessor computer system may atomically access a shared memory device to read and conditionally modify the stored value requiring minimal hardware and software control. The preferred embodiment illustrates the application of an interface unit constructed according to the present invention to synchronize processor access to a shared resource by controlling a lock variable, specifically the mutex variable corresponding to the resource. The following description is for purposes of explanation and specific components, times, signals, and any other descriptors are called out in order to provide a thorough understanding of the present invention. However, it will be apparent to one skilled in the art that the present invention may be practiced without these specific details.

Figure 1:
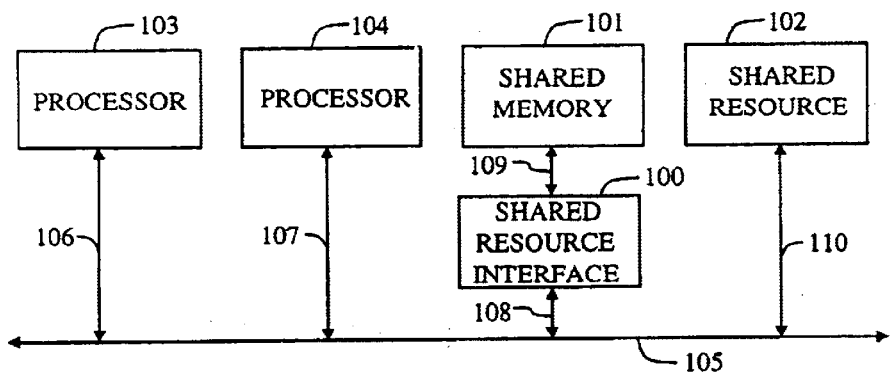
FIG. 1 is a block diagram illustrating a multiprocessor system including the shared memory interface.

An overall computer system using the techniques of the invention is shown in the block diagram of FIG. 1 wherein two central processors 103 and 104, a shared resource 102, and a shared memory 101, are interconnected via a system bus 105. The system bus 105 is comprised of a plurality of connections commonly available in embedded processor systems. The shared memory 101 is indirectly connected to the system bus 105 by means of the present shared resource interface 100. The system bus 105 may be extended to include other devices such as I/O units, a bus controller, as well as other processors and resources. The resource 102 may take the form of a block of addresses in a shared memory, an entire device, or a remote system.

The shared memory 101 is a conventional Random Access Memory (RAM) device commonly available for processor systems. The processors 103 and 104 perform computational tasks including tasks such as obtaining their data and instructions from, and storing their results to, the shared memory 101.

To avoid potential contention issues among the plurality of processors, a lock variable is assigned to each of the resources for which concurrent processor access could result in an incompatible use of the resource. The lock variable is stored in the shared memory 101 to which each of the processors 103 and 104 have access. The memory 101 itself may constitute another form of shared resource to which processor access might be regulated. The present invention permits a single shared memory device to simultaneously serve as both a conventional memory structure as well as the mutex storage device.

Figure 2:
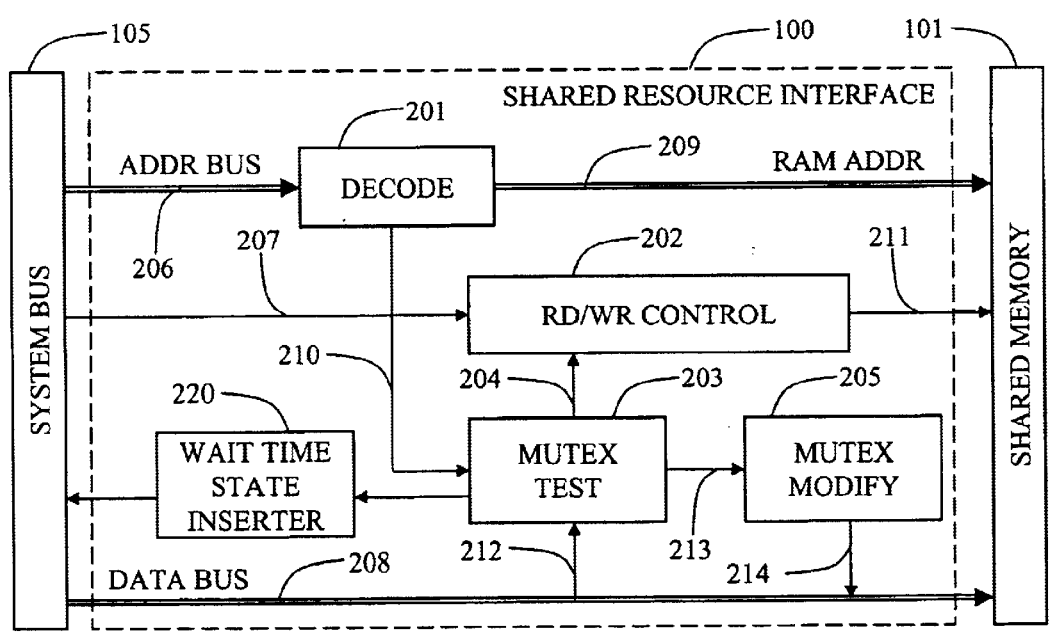
FIG. 2 is a block diagram of the shared memory interface for use in an embedded multiprocessor system for performing read-modify-write operations on a shared memory device.

Referring now to FIG. 2, The system bus 105 is comprised of a plurality of connections commonly available in processor units, including an address bus, a data bus, a signal for the control of read and write operations of the shared memory 101, as well as an address strobe signal. The system bus may further include one or more clock signals. The shared resource interface 100 includes a decode 201 coupled to the address bus 206 for receiving address signals that pass over the system bus 105. Decode 201 in turn passes a physical address to the shared memory 101 via RAM address bus 209 independent of whether the processor-generated access command is directed to "real" or "extended" address space. An address is referred to as a "real" address when a processor-generated access to such an address points directly to a physical memory device. An "extended" memory address must undergo translation to a real address of the physical memory. An extended memory address therefore only indirectly points to a physical memory device.

While a conventional interface is designed to be responsive to the range of real address space for which there is a corresponding device, the decode 201 in the present invention is made to respond to twice the number of addresses necessary to support conventional access of the memory 101. In this manner, the interface emulates a non-existent memory device. The memory space pointing to the "fictitious" memory device is made to be an alias of the real memory such that there are exactly two unique addresses that map into a single physical memory location, thereby creating an "extended" address space.

The read-modify-write operation is initiated with a processor-generated read command in combination with an extended memory address. The read command asserted through the RD/WR signal 207 causes the mutex value to be read out to the data bus 208 from shared memory 101, making the lock variable accessible to the mutex test 203 via DataTest signal 212. The fact that the read is of an extended memory address activates the mutex test 203 by causing the decode 201 to assert the DoTest signal 210. The initial value of the mutex variable is simultaneously read by the processor initiating the read. The logic circuitry of the mutex test 203 compares the mutex value read from shared memory 101 against a convention used to regulate processor access. This convention must be determined at the time of the design of the interface, and is specific to each of the embodiments of the present invention. Whether the test of the mutex fails depends on what form of conditional write is implemented. In the case of test-and-set, the mutex test fails if the resource is in the possession of another processor. In the second embodiment, the fetch-and-increment embodiment, the test fails if the resource is contemporaneously accessed by one or more additional processors and such concurrent use would conflict with that of the processor firstly requesting access.

If the test of the mutex executed by mutex test 203 indicates that the resource is available, the mutex value is modified in block 205 in a manner consistent with the predetermined convention indicating the change in the availability of the resource. The modified mutex value 214 is placed on the data bus 208 while the mutex's physical address is present on the RAM address bus 209. The mutex value 214 is then written to the shared memory 101 by means of the shared memory read/write signal 211 from the RD/WR control 202 when the DoMutexWrite signal 204 is asserted.

The shared resource interface 100 also supports conventional access by means of RD/WR control 202 for conveying processor-generated read and write commands to the shared memory 101. Conventional access refers to individual read and write operations that need not be atomically executed in combination with any other operation. Conventional memory access is asserted through the RD/WR signal 207, causing the RD/WR control 202 to function in the same manner as a typical memory interface. Note, the address signal of the address bus 206 is equivalent to the RAM address signal of the RAM address bus 209. The conventional read and write functionality is to be distinguished from read-modify-write access in which the RD/WR control 202 causes an additional write operation to commit the modified mutex value 214 to memory 101 only in conjunction with the assertion of the DoMutexWrite signal 204.

As illustrated in FIG. 2, the shared resource interface 100 in some embodiments also includes a processing means, e.g. wait time state inserter 220, operably coupled to the system 104. The processing means is adapted to selectively insert one or more wait timing states between a prior process-generated read command and subsequent write command generated by the interface 100 to modify the lock variable.

Figure 3:
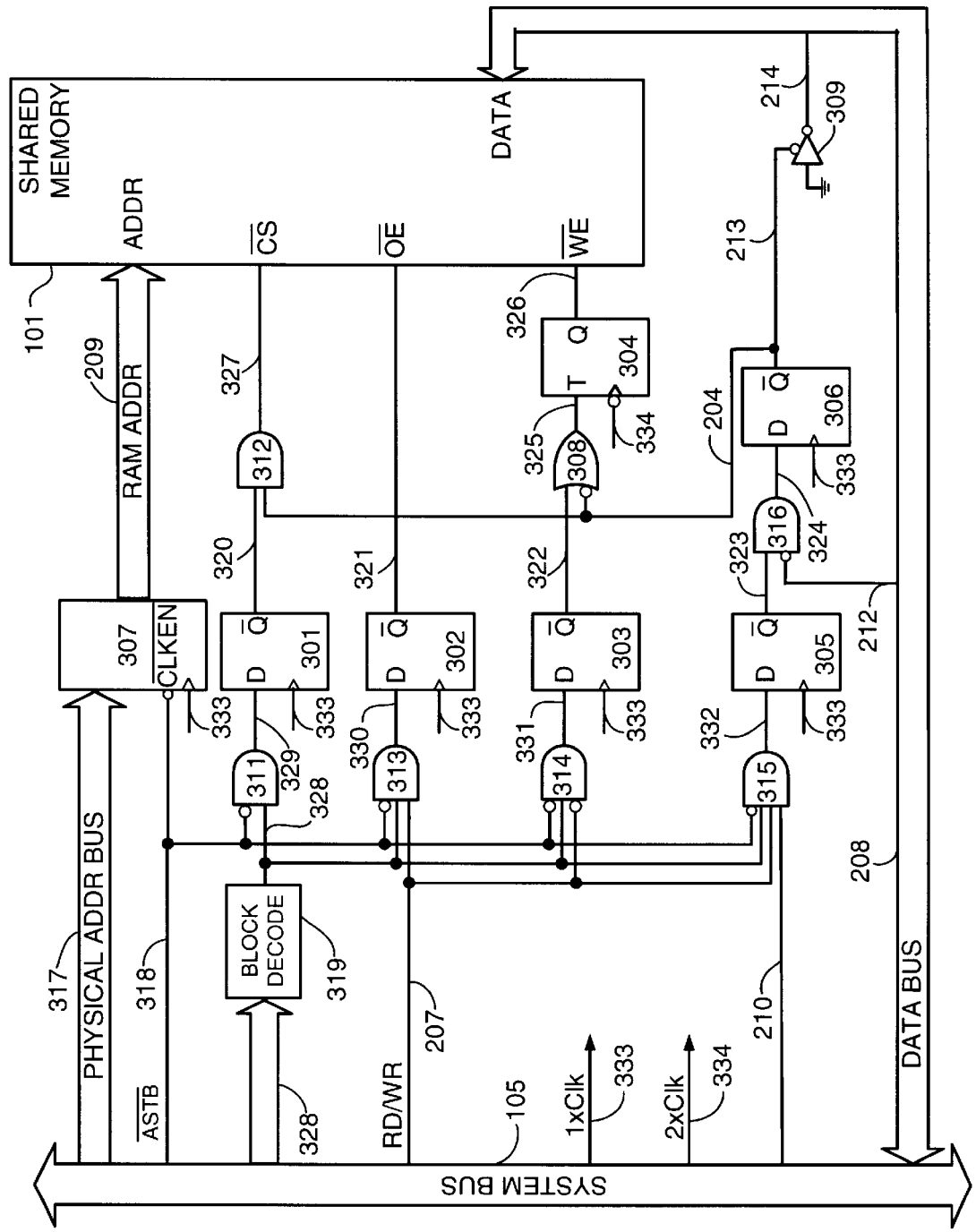
FIG. 3 is a diagram of the preferred embodiment of the present invention.

Referring to FIG. 3, the schematic diagram of the preferred embodiment demonstrates the shared resource interface 100 (illustrated in block form in FIGS. 1 and 2) and details of its interconnection to the system bus 105 and shared memory 101. The system bus 105 is comprised of a plurality of connections including an address bus 328, a data bus 208, a RD/WR signal 207 for read and write control, as well as an address strobe signal, $\overline{ASTB}$ 318, and two clock signals, 1×Clk 333 and 2×Clk 334. The shared memory 101 is a conventional Random Access Memory (RAM) device commonly available for processor systems, and includes an address input, ADDR; data interface, DATA; a chip select input, $\overline{CS}$; an output enable line, $\overline{OE}$; as well as a write enable input, $\overline{WE}$. For purposes of illustration, the RAM device is defined by R-bits, and therefore occupies a real address space that is $2^R$ locations. Where the present embodiment applies R=10, a 1K byte memory chip can be inferred. One skilled in the art will recognize that the system may also be adapted to utilize other forms of memory including SRAM or DRAM.

The block decode 319 is to be distinguished from the decode 201 of FIG. 2. Block decode 319 activates the interface 100 when the processor-generated address falls specifically within the range of address space dedicated to the particular device, both real and extended. The block decode 319 is responsive to the bus 328 which is comprised of the entire 32-bit wide address bus less the portion passed to address bus 317 and DoTest signal 210. The block decode 319 serves to selectively enable the interface upon a processor-generated memory access falling within the range of real and extended addresses dedicated to the interface 100 to the exclusion of all other addresses outside of this block. The output of the block decode 319 is then connected to the inputs of the various AND gates 311, 313, 314, and 315. The decode 201 of FIG. 2, on the other hand, is conceptually represented as the bifurcation of the address bus 206 into its constituent parts, namely physical address bus 317 and DoTest signal 210 as seen on FIG. 3. More specifically, the address bus 206 is comprised of the R-bits necessary to define the physical memory address as well as one additional bit, yielding a total of N=R+1 bits. The shared resource interface is therefore responsive to $2^{R+1}$ addresses, twice the address space occupied by the memory 101. The additional Nth bit, referred to the Next Most Significant (NMS) bit, is used to distinguish an access of the physical or extended memory space. The NMS bit, represented on FIG. 3 by the DoTest signal 210, is conveyed to the circuitry of the interface 100 dedicated to executing the read-modify-write functionality where it is used to distinguish a real address from an extended memory address.

The embodiments presented herein require double the address space that is physically occupied by the memory device in order to implement the read-modify-write functionality. Such a system effectively allows every memory location of the memory device to serve as a mutex variable. While this manner of encoding reduces the complexity of the decoding means and permits a high degree of versatility, it necessarily requires a significant amount of address space. One skilled in the art will recognize that alternative decoding means may be implemented to conserve the size of the extended address space where necessary.

The physical address bus 317 and the strobe signal, $\overline{ASTB}$ 318, are connected to the input of the address register 307 which holds the address on its output to the shared memory over the duration of either a read/write operation or a read-modify-write operation. The strobe signal 318 is also connected to the inverted input of each of the AND gates 311, 313, 314, and 315. The AND gates 311, 313, and 314, in concert with flip-flops 301, 302, and 303, convert the generic processor protocol to a signal convention specifically tailored to the memory device 101. The output of AND gate 311 is indirectly connected to the chip select via flip-flop 301 and AND gate 312. The AND gate 312 feeds the chip select for the duration of a read or write operation, and until the completion of a read-modify-write operation when applicable.

The RD/WR signal 207 is asserted under both a conventional read operation as well as the read operation of the read-modify-write instruction. The RD/WR signal 207 comprises the third input of the AND gate 313, whose output is registered by flip-flop 302 and conveyed to the output enable of the shared memory device 101.

The RD/WR signal 207 is also connected indirectly to the write enable of the shared memory 101, thereby supporting conventional write operations to the shared memory 101.

The RD/WR signal 207 is also asserted, activating the flip-flop 303, OR gate 308, and flip-flop 304. A conventional write instruction may be executed by any processor on any portion of the shared memory 101. The OR gate 308 is also activated by the DoMutexWrite signal 204 originating with the logic circuitry comprising the mutex test 203 (refer to FIG. 2) as part of the read-modify-write instruction, which is activated in the course of modifying the mutex.

The mutex test line, DoTest signal 210, signals a processor-generated access to an extended address space beginning a read-modify-write instruction. The DoTest signal 210 line is connected to AND gate 315, which in turn is coupled to flip-flop 305. Upon a read-modify-write operation, the output of flip-flop 305 is held for the input of flip-flop 306. The inverted output of flip-flop 306 is maintained for the duration of a second cycle, a write cycle, conditioned upon AND gate 316. If the test of the mutex is positive, the mutex is modified by means of buffer 309 which causes a value of one to be held on the data bus 208. Flip-flop 306 then causes a write signal, DoMutexWrite signal 204, to be asserted through OR gate 308 and flip-flop 304, a T-type flip-flop driven by the inverted 2×Clk 334. As a result, the write enable input of the shared memory 101 is activated, thus causing the mutex value to be saved in the shared memory 101.

Conventional Memory Access

Figure 4:
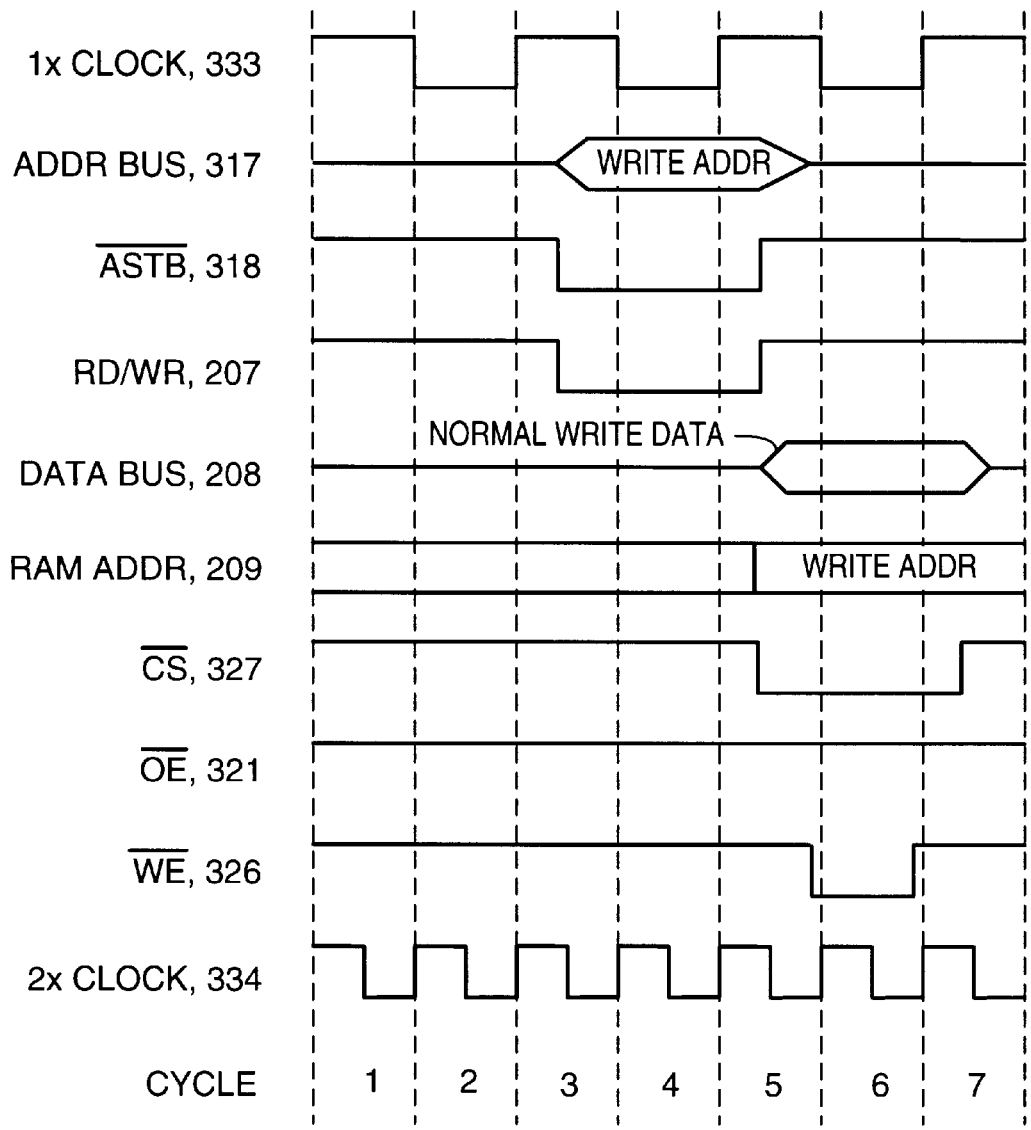
FIG. 4 is a timing diagram demonstrating a conventional write command to shared memory.

A processor-generated memory access to a real memory address results in a conventional form of read or write to the shared memory 101. Consider, as a first example, a processor-generated write command to the real memory address of the shared memory device 101, illustrated by the simultaneous reference to FIGS. 3 and 4. The address is placed on the physical address bus 317 in CYCLE 3 where it is made available to the shared resource interface 100, specifically address register 307.

In response to the processor-generated write command, the block decode 319 becomes asserted which, in combination with the strobe signal 318, causes AND gate 311 to become active. Flip-flop 301 then registers the DoAccess signal 320 asserted in CYCLE 5, thereby activating the chip select input of shared memory 101. The address register 307 also responds to the physical address bus 317 by registering upon the rising edge of the 1×Clk 333 when the strobe signal 318 is active, thereby making the physical address available to the shared memory 101 in CYCLE 5. At substantially the same time, the RD/WR signal 207 is registered by flip-flop 303, exiting flip-flop 303 as the DoWrite signal 322 and passing through OR gate 308 to flip-flop 304. The flip-flop 304, driven by the falling edge of the 2×Clk 334, is subsequently registered in CYCLES 5 and 6, thereby activating the write enable of the shared memory 101 that causes the data placed on the data bus 208 in CYCLE 5 to be stored into shared memory 101.

Figure 5:
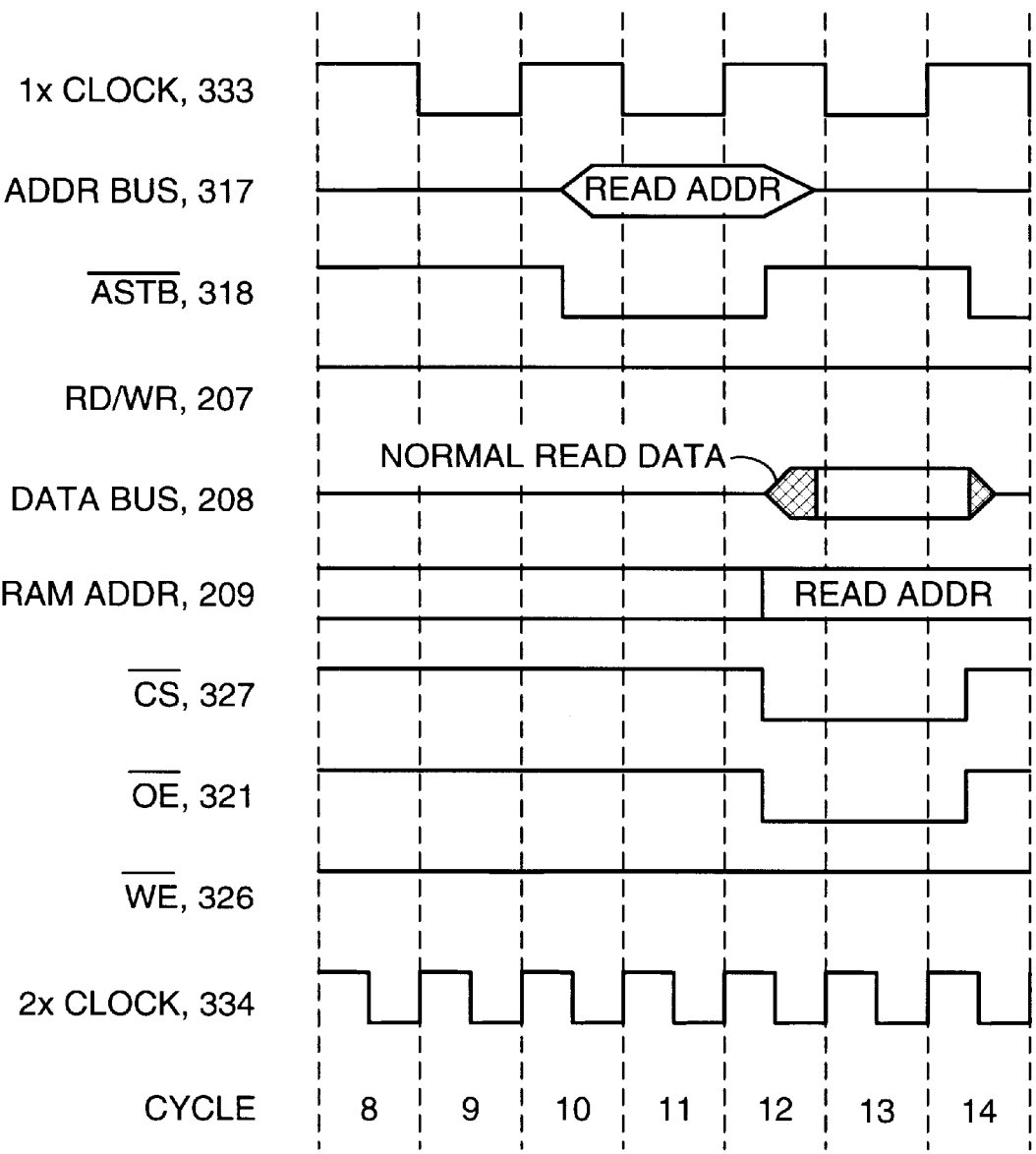
FIG. 5 is a timing diagram demonstrating a conventional read command to shared memory.

As a second example, a memory read command, which occurs by way of a memory access command to a real address, causes the address and chip select to be passed from the shared resource interface 100 to the shared memory 101 in the same manner as described above. Referring simultaneously to FIGS. 3 and 5, the input from the RAM address bus 209 and chip select are asserted at the beginning of CYCLE 12. In contrast to the write command, the AND gate 313 is activated when a read command is asserted. As a result, flip-flop 302 is registered, thus activating the output enable as shown CYCLE 12. The data value stored in the shared memory is subsequently driven out onto the data bus 208 at a time that is governed by the particular timing characteristics of the memory device.

Atomic Test and Set

The functional response of the shared resource interface 100 is dependent on the memory address accessed by a processor. In contrast to a processor-generated access to the real memory, an access to the extended address space causes the decode 201 to generate a physical address while initiating an atomic read and a modification contingent upon the value stored at the particular physical address.

Figure 6:
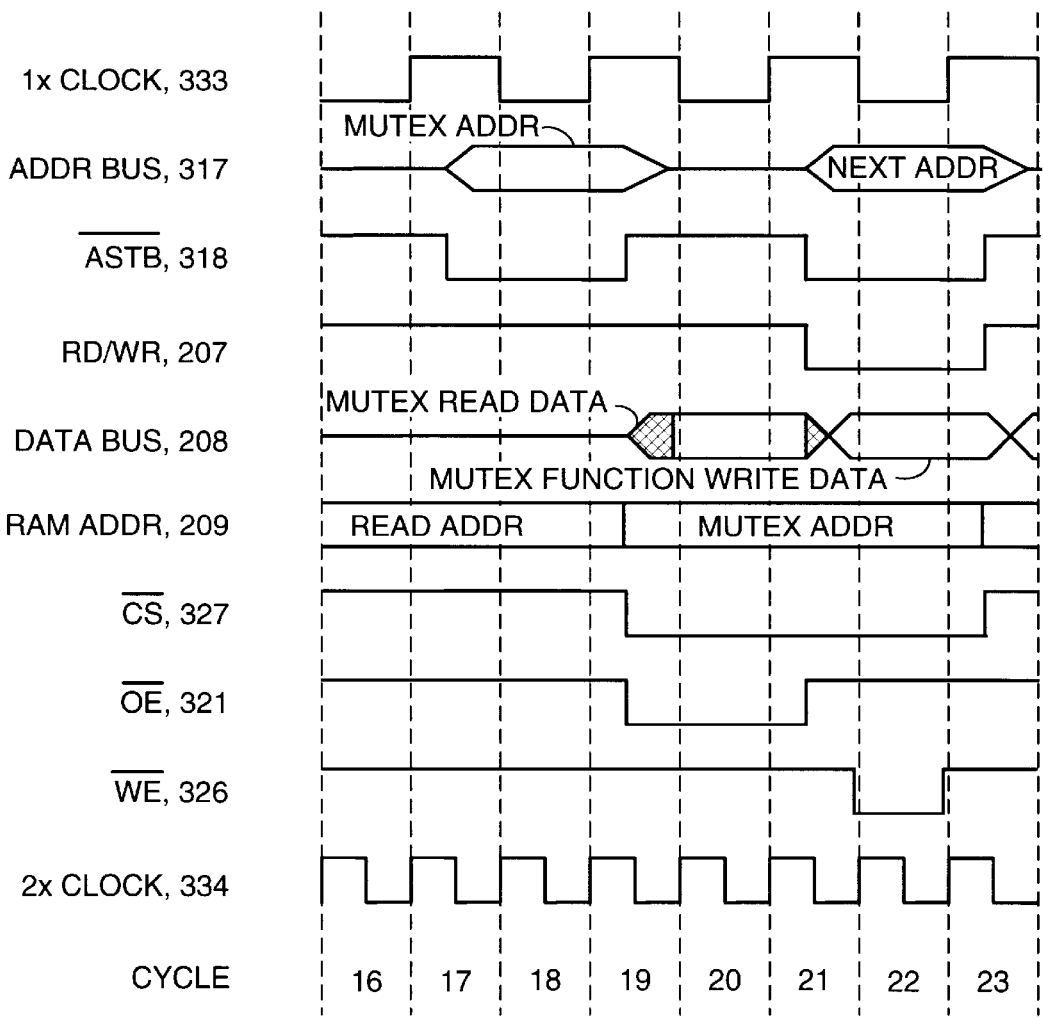
FIG. 6 is a timing diagram demonstrating test-and-set operation to shared memory.

Referring simultaneously to FIGS. 3 and 6, a read-modify-write operation begins with a read instruction as described above, the only difference being that the read access command is directed to the extended memory address, which activates the AND gate 315. By the completion of CYCLE 19, the RAM address 209, chip select, and output enable have been activated. At substantially the same time, the DoMutexWrite signal 204 is not asserted, thereby disabling buffer 309 and the write enable circuitry which would otherwise interfere with the initial read operation.

Whether the circuitry continues on to automatically perform the next write operation is conditioned upon the value of the lock variable. If the resource is not free, the conditional-write operation will terminate upon completion of the read operation. If the resource is available the write operation will immediately follow the read operation.

The subsequent write operation is initiated in the logic circuitry without the need for a processor-generated write command. The mutex value is read out onto the data bus 208 and returned to the requesting processor to signify the status of the resource. If a non-zero mutex value is returned to the processor, the resource is unavailable and no subsequent action is taken by the requesting processor. A zero value indicates that the resource is available, and would infer that a subsequent write operation was performed. The requesting processor then has exclusive possession once the update of the lock variable is completed.

Note, while the choice of mutex values is arbitrary, one skilled in the art could extend the capabilities of the mutex to record other information, including the identity of the processor and whether it has read or write access, information which may in turn be used to regulate concurrent processor access.

The test of the lock variable is executed by the logic circuitry while still on the data bus 208 as shown in CYCLE 20 of FIG. 6. Unless the mutex is zero, flip-flop 306 is registered at the onset of CYCLE 21. Through flip-flop 306, the DoMutexWrite signal 204 is asserted. The modified mutex value, which manifests itself as a non-zero data write 214, is written to the data bus 208. With the output of OR gate 308 asserted, flip-flop 304 toggles at a time coinciding with the falling edge of the 2×Clk 334, thereby enabling the write enable input of the shared memory 101. Upon completion of the write operation in CYCLE 23 the modified mutex value signifies to all other processors that the resource to which the lock variable corresponds is now in the possession of the requesting processor.

Referring still to FIG. 6, it is important to note that the combination of read and write operations are distributed over the period of two bus cycles as set by the 1×Clk 333. The address and data are staggered such that the address is placed on the system bus 105 and registered at the beginning of CYCLE 19, and the data appears immediately as illustrated in CYCLE 20. In the case of a mutex write operation, the write command is inserted in the first 1×clock cycle that follows the read command, specifically CYCLE 22. According to the preferred embodiment, the write operation CYCLE 22 may take place concurrently with the beginning of the next hypothetical access as signified by the placement of the address on the physical address bus 317. The shared resource interface 100 is designed such that the write operation is completed within the dead time of the subsequent instruction. As a result, the mutex write operation is executed with no additional bus cycles or loss of efficiency. If so desired, additional wait states may be inserted in order to distribute the read-modify-write operation over the period of three or more clock cycles in accordance with the 1×Clk 333.

Reset Mutex

A resource must be released by the processor in possession of the resource upon completion of its task in order to make it available once again. The mutex must then be reset back to zero before another processor may assert possession. Unlike the initial read-modify-write operation there is no requirement that the instruction be atomic. In fact, the mutex is reset with a single operation target to the real memory address as described above. Until the resource is made available by the processor in possession, any other processor attempting to gain access will find the resource unavailable upon a read-modify-write operation.

Alternative Embodiments

The preferred embodiment implements the test-and-set functionality in which the mutex is restricted to either a zero or non-zero value to convey information as to the availability of the resource. Of course, the invention may implement other forms of functionality which are capable of producing comparable results. Referring to FIG. 2, the means for performing the test 203 and modification 205 mutex may be substituted with means for performing fetch-and-increment.

In a fetch-and-increment embodiment, the additional write operation performed upon a successful test of the mutex is made contingent upon the nature of the other processors' access to the resource. For example, an unlimited number of processors are afforded access to the resource for purposes of reading the resource to the exclusion of any processor that requires write access. Furthermore, a processor in possession of a resource for purposes of writing to the resource holds possession of the resource to the exclusion of any other processor.

The means for modifying the mutex takes the form of an increment operation in which a processor raises the value of the flag variable to signify concurrent possession of the resource, and a decrement operation to release the resource. Note, the decrement operation, unlike the reset of the mutex in the course of a test-and-set, requires both a read and a write of the mutex. The decrement instruction must be atomic for the same reasons as the test-and-set instruction. While the logic circuitry is intended to support both increment and decrement operations, such functionality may be implemented using one of a variety of means. For example, two distinct extended memory addresses might be assigned to initiate the increment and decrement operations, or a single extended memory address could be used in combination with the read/write command signal.

A synchronization scheme with fetch-and-increment support requires the use of a multiple-bit flag variable. The shared resource interface is intended to perform bit wise encoding in which the mutex is made to store two divisible counters; one counter recording the number of processors granted access to the resource for read-only operations, and the other counter indicating the presence of a processor with read/write access. In this manner, multiple processors may acquire concurrent access provided that such access is mutually compatible.

METHOD OF THE PRESENT INVENTION

Figure 7:
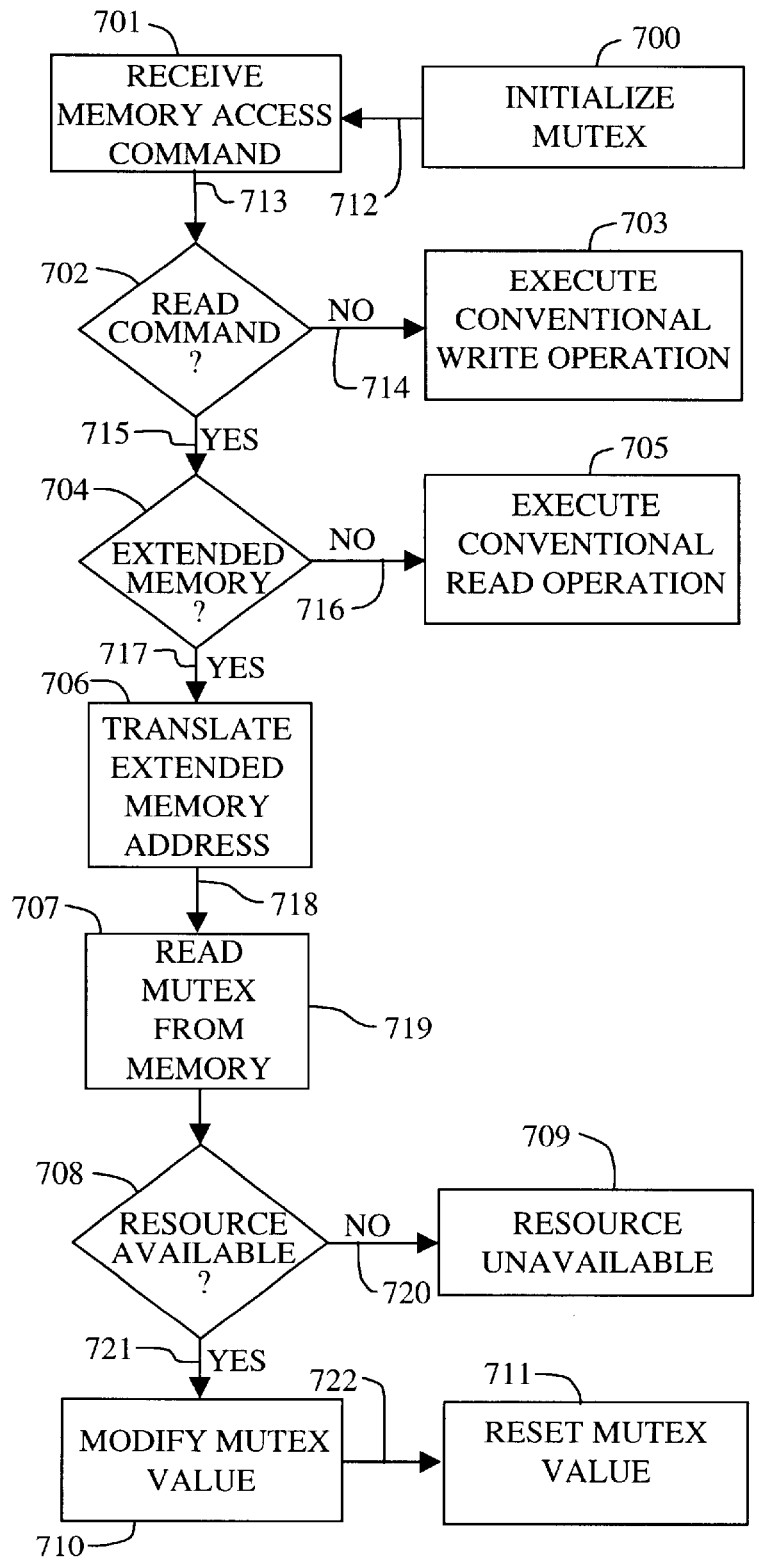
FIG. 7 is a flow diagram demonstrating the process of executing a read-modify-write operation using the present invention.

Referring to FIG. 7, the method by which the shared resource memory interface executes a read-conditionalmodify is illustrated. In block 700 the lock variable is initialized by the system software in accordance with the availability convention with which the interface 100 is initially designed. In the case of test-and-set the lock variable is preferably given an initial value of zero indicating that the shared resource is available to a requesting processor for read or write purposes. Since the shared memory 101 is accessible by means of both conventional read and write access as well as test-and-set operations the shared memory 101 may be used to store both the lock variable as well as a shared memory resource with which it is associated. One skilled in the art will recognize the advantage to be attained by the contiguous storage of a lock variable with the corresponding shared memory resource.

After initialization the shared memory 101 is available to each of the plurality of processors. Since the functionality of the interface is dependent on the nature of the access as well as the address to which a processor-generated command is directed, the interface 100 must make an initial distinction as to the character of the command. Once an access command is received from one of the plurality of processors in block 701 the interface 100 discriminates between a read command and a write command in decision block 702. The case of a write command directed to extended memory is then to be defined for a specific implementation. All processor-generated write operations therefore contemplate physical memory addresses as indicated in block 703. Read commands on the other hand are targeted towards both real and extended address space, and are distinguished in decision block 704. Where the read operation is used to initiate a read-modify-write operation, the method of the present invention proceeds to block 706 where the extended memory address is translated into the associated physical address which is subsequently conveyed to the shared memory 101. With the RD/WR signal 207 asserted (read) the lock variable is read from memory in block 707 and the availability of the resource determined in decision block 708.

Referring still to FIG. 7, the sophistication of the test of the mutex present in decision block 708 will vary depending on the nature of the functionality sought. The test-and-set embodiment involves the simplest of tests in which the outcome is determined by the state of a single bit. The fetch-and-increment embodiment is a more complex logic circuit in which the activity of the requesting processor as well as any processor previously granted possession must be factored.

If the decision in block 708 should be answered in the negative, the requesting processor may choose any one of a number of options when in block 709 including quitting or spinning on the lock until the resource is relinquished. If the resource is available, the requesting processor may proceed to block 710 where the lock variable is automatically updated to assert possession of the resource. Note, this write operation is executed atomically with the prior read command thus preventing any other processor from potentially altering the resource without authorization to access the resource. In the preferred embodiment, a value of one is written into the lock variable, indicating the current unavailability of the resource. One skilled in the art will recognize that a more complicated word may be used to convey more information, including the identity of the processor or the nature of the use of the resource, for example. Upon completion of its task, the processor in possession relinquishes control by means of a conventional write operation in block 711 in which the lock is modified to represent the current availability status.

As one skilled in the art will recognize, the interface can be implemented in a variety of different forms. For example, both test-and-set as well as fetch-and-increment functionality can be supported simultaneously where the choice of functionality can be selected using additional control lines or by means of addressing one of multiple extended address spaces.

The foregoing describes two embodiments of a shared resource interface supporting atomic read and conditional write operations. It is contemplated that modifications and variations may be made by one skilled in the art in the components and their configuration in the present invention without departing from the spirit and scope of the invention. Accordingly, although the above description contains many specifications, these should not be construed as limiting the scope of the invention, but rather as merely providing illustrations of some of the presently preferred embodiments of this invention.

Therefore, the invention has been disclosed by way of example and not limitation, and reference should be to the following claims to determine the scope of the present invention.

We claim:

1. A shared memory interface for synchronizing access of a plurality of processes to one or more shared resources; said interface being connected to a shared memory and a system bus including an address bus, a data bus, and a read/write control line; each shared resource having an availability that is indicated by an associated lock variable stored in said shared memory; each lock variable being accessible by at least two addresses including a physical memory address and an extended memory address made to act as an alias of said physical memory address; said interface comprising:

(a) decoding means, responsive to the address bus, for generating said physical memory address of said lock variable from said extended memory address;

(b) reading means for placing on the data bus a value stored at a physical memory address of the shared memory in response to a conventional process-generated read command;

(c) writing means, responsive to the system bus and said decoding means, for writing to the shared memory; said writing means comprising:

(1) conventional writing means for unconditionally writing to the shared memory in response to a process-generated write command; and (2) mutex writing means for automatically modifying a lock variable, contingent upon the availability of the shared resource, by generating a write command executed atomically with a prior process-generated read command targeted to an extended memory address that causes the lock variable to be returned to the process, wherein the lock variable is modified without any of the plurality of processes seeking access to the one or more shared resources generating a write command to modify the lock variable;

whereby each process possesses conventional read and write access to said shared memory, as well as atomically modify lock variables to signify the availability of shared resources.

2. The shared resource interface as set forth in claim 1 wherein the mutex writing means modifies the lock variable of claim 1(c)(2) from a first value indicating the availability of the shared resource to a second value indicating exclusive possession of the shared resource by the process that generated the prior process-generated read command targeted to the extended memory address.

3. The shared resource interface as set forth in claim 1 wherein the mutex writing means executes one of a plurality of modifications of the lock variable of claim 1(c)(2), including a first modification, indicating that the shared resource is available to multiple processes for purposes of mutually compatible access, and a second modification indicating that the resource is available exclusively to the process that generated the prior process-generated read command targeted to the extended memory address.

4. The shared resource interface as set forth in claim 3 wherein the first modification of the lock variable involves incrementing the lock variable, having a numerical value, by a predetermined number.

5. The shared resource interface as set forth in claim 1 wherein one or more of the processes is a digital processor.

6. The shared resource interface as set forth in claim 5 wherein at least one of said one or more shared resources is a block of memory accessible by the plurality of processes.

7. The shared resource interface as set forth in claim 6 wherein said block of memory is stored in the same shared memory for storage of lock variables, whereby each lock variable may be stored contiguously with the associated shared resource to which access is regulated.

8. The shared resource interface as set forth in claim 6 wherein said decoding means makes use of a next most significant bit associated with an address signal on the address bus for initiating the mutex writing means.

9. The shared resource interface as set forth in claim 5 wherein said reading means and writing means are executed using digital logic circuitry.

10. The shared resource interface as set forth in claim 6 wherein the prior process-generated read command targeted to the extended memory address and subsequent modification of the lock variable by said mutex writing means are executed within a single bus access.

11. The shared resource interface as set forth in claim 5 wherein said writing means further includes processing means for selectively inserting one or more wait timing states between the prior process-generated read command and subsequent modification of the lock variable of claim 1(c)(2).

12. A shared memory interface for synchronizing access to one or more resources shared by a plurality of processes where said interface is connected to a system bus and a shared memory holding one or more lock variables, each lock variable associated with and indicating an availability of a single shared resource; each lock variable being accessible by at least two addresses including a physical memory address at which the lock variable is stored and an extended memory address made to act as an alias of said physical memory address; the interface comprising;

(a) decoding means, responsive to the system bus, for converting extended memory addresses to their corresponding physical memory addresses;

(b) testing means, responsive to the decoding means and system bus, for valuating said lock variable in response to a read operation directed toward said extended memory address; an initial value of the lock variable read being returned in response to the read operation;

(c) modifying means, responsive to said testing means, for modifying the lock variable to represent a change in availability of the resource on the condition that the shared resource is available; and (d) control means, responsive to the testing means and the system bus, for asserting read and write control of the shared memory; said control means comprising;

(1) reading means for executing conventional read operations to the shared memory in response to read operations directed to physical memory addresses;

(2) first writing means for executing conventional write operations to the shared memory in response to write operations directed to physical memory addresses; and (3) second writing means, responsive to the testing means, for executing atomic write operations causing a modified lock variable generated by the modifying means to be automatically written to the shared memory contingent upon the availability of the shared resource; each atomic write operation being executed indivisibly with a prior read operation directed to said extended memory address; wherein the modified lock variable is written to the shared memory without any of the plurality of processes seeking access to the one or more shared resources generating a write command to modify the lock variable in the shared memory;

whereby each process possess conventional read and write access to said shared memory, as well as exclusive access to each shared resource.

13. The shared resource interface as set forth in claim 12 wherein one or more of the plurality of processes is an individual processor.

14. The shared resource interface as set forth in claim 13 wherein said shared resource is a block of memory accessible to each of the plurality of processes.

15. The shared resource interface as set forth in claim 14 wherein said block of memory is the shared memory.

16. The shared resource interface as set forth in claim 14 wherein said decoding means outputs a control signal being a next most significant bit associated with the extended memory address.

17. The shared resource interface as set forth in claim 12 wherein said testing means and modifying means are executed using logic circuitry.

18. The shared resource interface as set forth in claim 12 wherein said modifying means atomically modifies the lock variable within a single bus access.

19. The shared resource interface as set forth in claim 12 wherein said modifying means further comprises processing means for selectively inserting one or more wait timing states.

20. A method for synchronizing access to one or more shared resources by a plurality of processors in an embedded processor system including a shared memory and a system bus comprised of an address bus, a data bus, and a read/write control signal; the shared memory storing conventional data in addition to one or more lock variables, each lock variable accessible through a physical memory address and a corresponding extended memory address; the method comprising the steps of:

(a) predefining a word convention comprised of a plurality of words; each word indicating a status of availability for the one or more shared resources;

(b) reading conventional data from the shared memory to the data bus in response to read operations directed toward physical memory addresses of the shared memory;

(c) writing conventional data held on the data bus to the shared memory in response to write operations directed toward physical memory addresses of the shared memory;

(d) processing read operations directed to the extended memory address of each lock variable stored in shared memory in accordance with the steps of;

(1) decoding the extended memory address of the read operation into the physical memory address;

(2) reading the lock variable at the physical memory address from shared memory; the lock variable indicating the status of availability of the shared resource;

(3) automatically and atomically modifying the lock variable in accordance with the word convention if access by a requesting processor is compatible with any existing use of the shared resource, wherein the lock variable is modified without any of the plurality of processors seeking access to the one or more shared resources generating a write command to modify the lock variable; and (e) resetting the lock variable in accordance with the word convention to relinquish control of the shared resource by the requesting processor;

whereby access to a resource shared by the plurality of processors is limited to those processors whose use of the one or more shared resources are mutually compatible.

\* \* \* \* \*

UNITED STATES PATENT AND TRADEMARK OFFICE
CERTIFICATE OF CORRECTION

PATENT NO. : 6,795,901 B1  Page 1 of 1
APPLICATION NO. : 09/466303
DATED : September 21, 2004
INVENTOR(S) : Randall A. Florek and Claire J. Lacour It is certified that error appears in the above-identified patent and that said Letters Patent is hereby corrected as shown below:

In the claims:
CLAIM 7, COLUMN 13, LINES 21-22 change "with the associated shared" to --with the shared--

Signed and Sealed this

Eleventh Day of November, 2008

JON W. DUDAS
*Director of the United States Patent and Trademark Office*